United States Patent

Nguyen

Patent Number: 5,323,596
Date of Patent: Jun. 28, 1994

[54] OPEN METALLIC CORD FOR PENETRATION BY ELASTOMER

[75] Inventor: Gia V. Nguyen, Arlon, Belgium

[73] Assignee: The Goodyear Tire & Rubber Company, Akron, Ohio

[21] Appl. No.: 608,870

[22] Filed: Nov. 5, 1990

[51] Int. Cl.$^5$ .............................. B60C 9/00
[52] U.S. Cl. ............................... 57/214; 57/212; 57/221; 57/902; 152/527
[58] Field of Search ............ 57/212, 214, 217, 218, 57/221, 902, 200; 152/556, 557, 558

[56] References Cited

U.S. PATENT DOCUMENTS

| | | | |
|---|---|---|---|
| 4,408,444 | 10/1983 | Baillevier | 57/902 X |
| 4,506,500 | 3/1985 | Miyauchi et al. | 57/218 X |
| 4,545,190 | 10/1985 | Rye et al. | 57/902 X |
| 4,586,324 | 5/1986 | Mizuma | 57/902 X |
| 4,627,229 | 12/1986 | Bourgois | 152/556 X |
| 4,690,191 | 9/1987 | Kawasaki | 152/527 |
| 4,781,016 | 11/1988 | Sato et al. | 57/902 X |
| 4,917,165 | 4/1990 | Umezawa | 152/556 X |
| 4,986,327 | 1/1991 | Takahira | 57/902 X |

FOREIGN PATENT DOCUMENTS 2221929   8/1989   United Kingdom ............ 57/902

Primary Examiner—Daniel P. Stodola
Assistant Examiner—John F. Rollins
Attorney, Agent, or Firm—T. P. Lewandowski

[57] ABSTRACT

Metallic cord for reinforcing elastomeric articles and apparatus for making same including a round section and equal diameter filaments and a core (11) of two strands of two filaments (5,6,15,16) one strand being untwisted and the other strand having a twist and a first lay length so as to be twisted around the one strand.

An outer layer (12) of filaments (21-28) twisted around the core (11) and having the same twist direction and a second lay length half of the core (11) lay length.

9 Claims, 5 Drawing Sheets

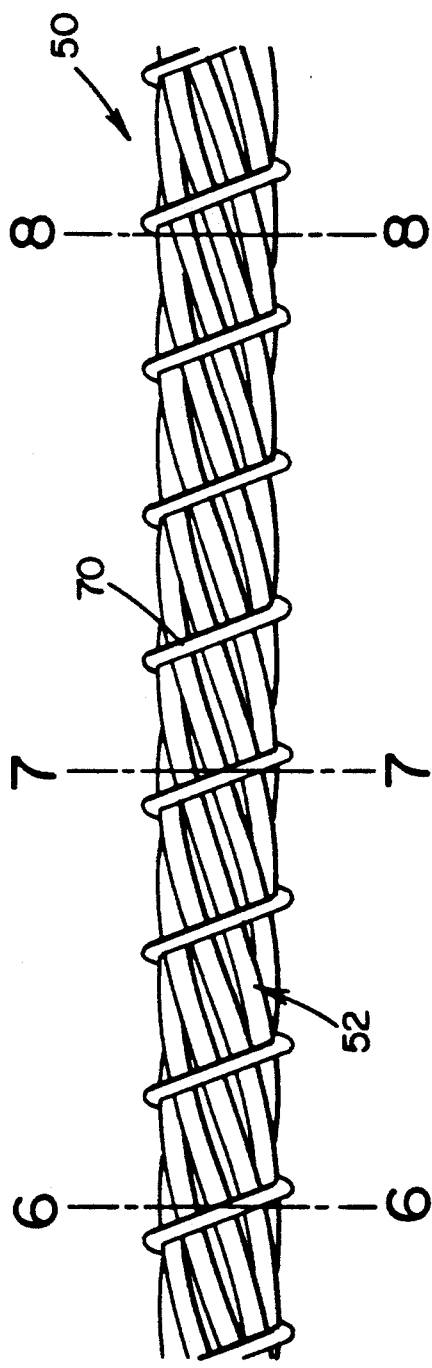
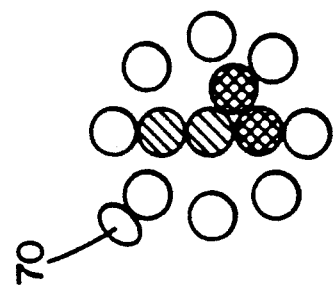
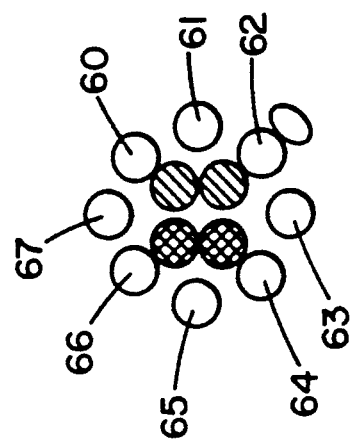
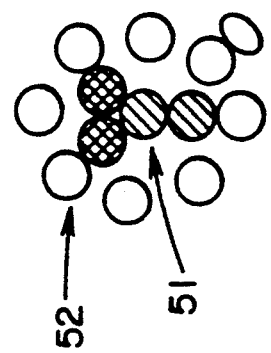

OPEN METALLIC CORD FOR PENETRATION BY ELASTOMER

The present invention relates to steel cords adapted for the reinforcement of elastomeric articles such as pneumatic tires, hoses or conveyor belts and more particularly to cords for use as reinforcing elements for the belt structure of radial truck tires. The invention covers also an apparatus for manufacturing these cords.

The types of steel with which the invention is most concerned are steels having a carbon content between 0.6 and 1%, preferably between 0.7 and 0.9%.

BACKGROUND OF THE INVENTION

Conventionally cord filaments have a round cross-section, i.e. a cross-section which fits substantially into a circle, though the use of shaped filaments, for instance flat wires, is gaining acceptance in the tire reinforcement field. It is common to provide the filaments with a thin coating of an alloy including at least copper and zinc, which increases the adhesion level of the filament with elastomeric material, particularly during the vulcanization process.

It has been observed, that when pneumatic tires reinforced by steel cords are cut or punctured, the exposed cord rapidly deteriorates upon contact with corrosive liquids, such as salt solutions or water. The liquid enters the cut or puncture and rapidly progresses along the entire length of cord destroying the tire assembly. It is believed that one reason for this deterioration is an imperfect rubber penetration through the twisted cord during the vulcanization step of the tire. The resulting voids within the cord construction facilitate the penetration of the corrosive liquid along its length. A complete rubber penetration into the inside of the cord also suppresses the risk of filament migration within the cord.

In order to avoid the above problems, a great number of so-called open cords or rubber penetrating constructions, wherein a rubber layer is interposed between the steel filaments, has been proposed. Open cord constructions like 2+2, 3+1, 2×1 have been successful in the passenger tire field. However, in case of multilayered structure cords, as are required to reinforce the elastomeric material of light-truck and truck tires, it has up to now not been possible to develop a cord construction allowing a complete penetration of the elastomeric material into the inner core of the cord.

SUMMARY OF THE INVENTION

The present invention overcomes the above drawbacks with a steel cord having an excellent resistance to corrosion propagation, and more particularly with a metallic cord for reinforcing elastomeric articles having a plurality of filaments comprising a core of (m+n) filaments, the m filaments being untwisted and the n filaments having a twist and twisted around the m filaments, wherein m is between 2 and 3 and n between 1 and 3 and an outer layer of p filaments twisted around the core and having the same twist direction, wherein p is between 6 and 9.

Further, the present invention anticipates an apparatus for making the cord in a one pass process, at low cost and with high productivity. Particularly anticipated is an apparatus for stranding together a cord having a core of (m+n) filaments, m being between 2 and 3 and n between 1 and 3 and an outer layer of p filaments, p being between 6 and 9. The apparatus comprises a stationary set of spools supplying the p filaments, a first and a second strander, wherein each strander has a rotating flyer and a non-rotating spool cradle suspended from the flyer. Spools, supplying said m and n filaments are supported by the spool cradle of the first strander, the flyer of the first strander having means for guiding the m and n filaments so that they are twisted. The apparatus comprises further means for guiding the (m+n) filaments out of said first strander unto a joining point, where they join said p filaments before entering the second strander, as well as means for guiding the (m+n)+p filaments around the flyer of the second strander so that they are twisted before the finished cord passes onto collecting means supported by the spool cradle of the second strander. The collecting means provide the pulling force required for drawing the filaments through and around the constituent parts of the apparatus. There are means for rotating the two stranders at substantially the same rotating speed.

There is still further provided in accordance with the present invention a method for stranding together a cord with a first and a second strander, wherein each strander has a rotating flyer and a non-rotating spool cradle suspended from the flyer, said cord having a core of (m+n) filaments, m being between 2 and 3 and n between 1 and 3 and an outer layer of p filaments, p being between 6 and 9, the method comprising supplying the p filaments from a stationary set of spools, supplying said m and n filaments from spools supported by the spool cradle of the first strander, guiding the m and n filaments around the flyer of the first strander so that they are twisted, guiding the (m+n) filaments out of said first strander unto a joining point, where they join said p filaments before entering the second strander, guiding the (m+n)+p filaments around the flyer of the second strander so that they are twisted, collecting the finished cord onto means supported by the spool cradle of the second strander, said collecting means providing the pulling force required for drawing the filaments through and around the constituent parts of the apparatus and rotating the two stranders at substantially the same rotating speed.

Preferred embodiments of the cord provide the possibility to use filaments having the same diameter and no risk of filament migration, but the new cord construction can also be used with varying filament diameters as well.

BRIEF DESCRIPTION OF THE DRAWING

To acquaint persons skilled in the art most closely related to the instant invention, certain preferred embodiments are now described with reference to the annexed drawings. These embodiments are to be considered as being merely illustrative and can be modified in numerous ways within the spirit and scope of the invention defined in the claims.

FIG. 5 is a side elevation view of a cord made in accordance with another embodiment of the invention;

FIG. 6 to 8 are cross-sectional views taken along lines VI—VI to VIII—VIII, respectively, of FIG. 5;

DESCRIPTION OF THE PREFERRED EMBODIMENT

As used herein and in the claims:

"Cord" means one or more of the reinforcement elements, comprising one or more filaments/wires which may or may not be twisted or otherwise formed, which may further include strands which strands may also be formed, of which the plies in a product are comprised.

"Filament" means an individual metallic wire.

"Lay length" means the axial distance required for a filament, strand or layer to make one 360-degree helical revolution in a strand or cord.

"Strand" means a group of filaments combined together to form a unit.

"Twist" means the number of turns about its axis per unit of length in a filament, strand or cord.

"Twist direction" means the slope of the helix of a filament, strand or layer when the cord is held vertically and may be left or right. If the slope of the spirals conforms in direction to the slope of the center portion of the letter "S", then the twist is called "S" or "left-hand". If the slope of the spirals conforms to the slope of the center portion of the letter "Z", then the twist is called "Z" or "right-hand".

Figure 1:
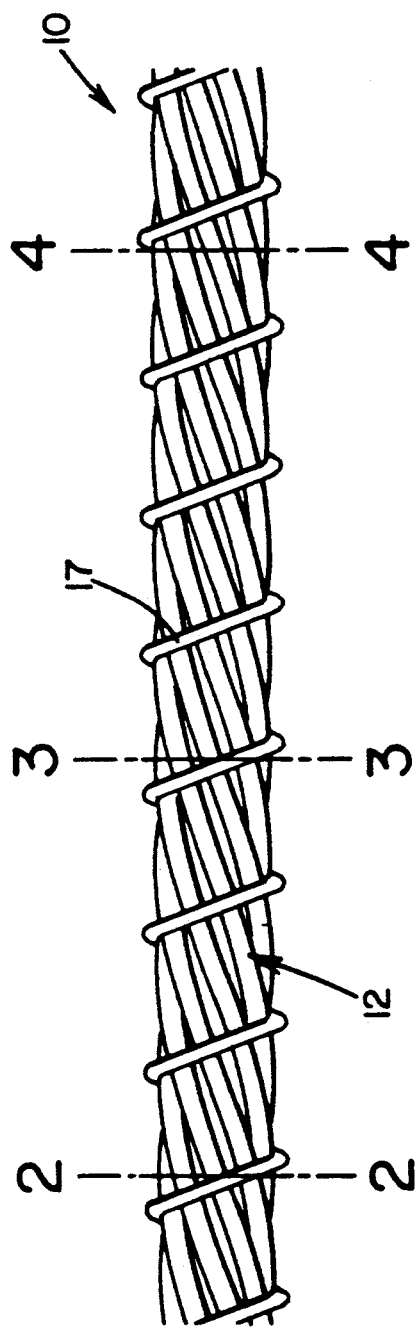
FIG. 1 is a side elevation view of a cord made in accordance with one embodiment of the invention.

Referring first to FIG. 1, there is shown a side elevation view of a metallic cord 10 made in accordance with a first embodiment of the invention which comprises a core 11 of two strands of two filaments each;

an outer layer 12 of nine filaments 20–28 twisted around said core; and a filament 17 wrapped around the outer layer 12. The diameter of the wrapping filament is usually 30% to 70% smaller than the diameter of the other filaments; preferred diameters are comprised between 0.12 and 0.18 mm. Twist direction and lay length of the wrapping filament 17 may be different from the twist direction and lay length of the filaments 20–28 of the outer layer 12. In the embodiment shown, the twist direction of the wrapping filament is opposed to and the lay length is about three times lower than respectively the twist direction and the lay length of the outer layer. The presence of a wrapping filament is not compulsory; its main function is to keep the different strands or filaments in place. The contribution of the wrapping filament to the strength of the cord is negligible.

The core comprises a first strand of two untwisted filaments 5, 6 and a second strand of two twisted filaments 15, 16 twisted around the first strand. The second strand and core twists are in the same direction. The filaments 20–28 of the outer layer are twisted around the two core strands. The 9 filaments of the outer layer have the same twist direction as the second strand of the core but a lay length which is twice as short as the lay length of the second strand of the core. Preferred lay lengths of the second strand of the core range between 14 and 34 mm and most preferred are lay lengths comprised between 22 and 26 mm. It follows that lay lengths of the outer layer are comprised between 7 and 17 mm and most preferred are lay lengths between 11 and 13 mm. The diameters of the filaments of the core and of the outer layer are substantially equal and preferably comprised between 0.20 and 0.30 mm.

Though the cord represented on the figures has an "S" twist, it is also possible to give the different spirals a "Z" twist without changing its properties.

Figure 4:
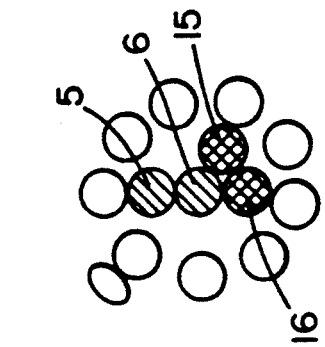
FIGS. 2 to 4 are cross-sectional views taken along lines II—II to IV—IV, respectively, of FIG. 1.
Figure 3:
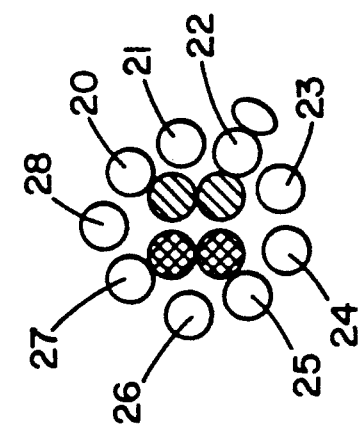
Figure 2:
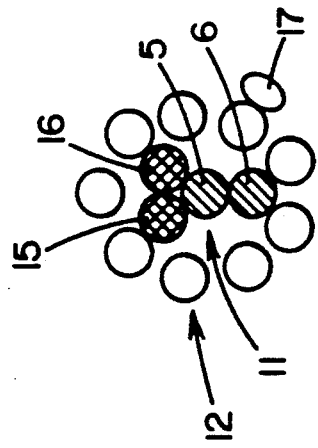

FIGS. 2 to 4 are cross-sectional views taken along the lines II—II to IV—IV of FIG. 1, showing the position of the different filaments along the cord length.

Referring now to FIG. 5, there is shown a side elevational view of a metallic cord 50 made in accordance with another embodiment of the invention. The cord 50 shown in FIG. 5 is an alternate construction to the cord shown in FIG. 1 and comprises a core 51 of two strands of two filaments each;

an outer layer 52 of eight filaments 60–67 twisted around the core; and a filament 70 wrapped around the outer layer 52.

The major difference with the cord shown in FIG. 1 lies in the number of the filaments making up the outer layer: the cord shown in FIG. 5, though having a slightly lower strength, has still larger gaps occurring between neighboring filaments of the outer layer, due to the absence of the ninth filament. These gaps favor more effectively the complete penetration of the elastomeric compound into the cord center.

FIGS. 6 to 8 are cross-sectional views taken respectively along lines VI—VI to VIII—VIII of FIG. 5.

The constructions shown on FIGS. 1 and 5 can be generally defined as an (m+n)+p cord, the m filaments being untwisted, the n and p filaments having the same twist direction but a different lay length. A spiral wrap can be provided. In order to achieve a balance between the requirements of openness of the construction, strength and ease of manufacture as well as filament migration, the number of core filaments forming strands m should be between 2 and 3 and n between 1 and 3 respectively, whereas the number of filaments p in the outer layer should be between 6 and 9.

It is believed that the excellent corrosion resistance of the cord construction is due to the complete rubber penetration inside its core.

Figure 9:
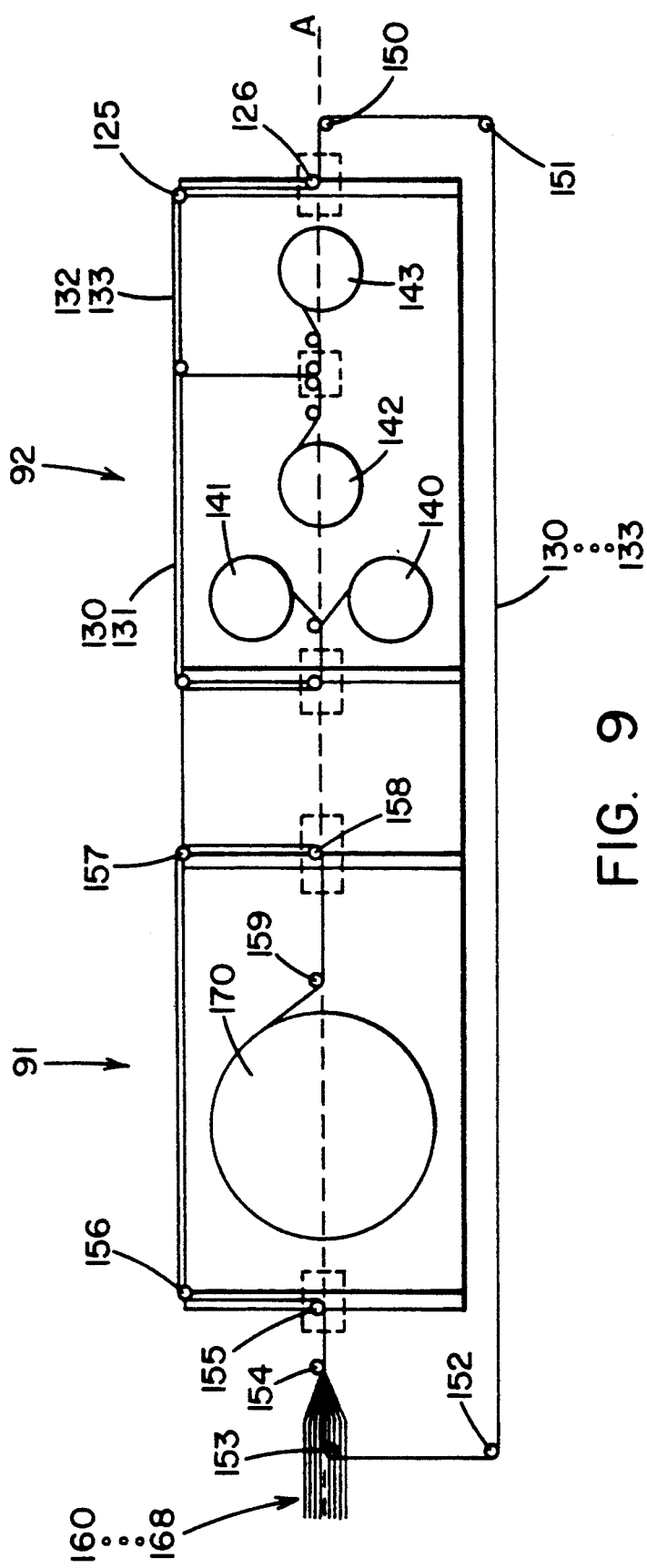
FIG. 9 is a schematic view of a machine which can be used for building a (2+2)+9 cord.

The twisting apparatus schematically represented in FIG. 9 is essentially composed of two so-called 2 for 1 stranders 91 and 92. The two stranders share a common driving unit (not represented) and are connected together by any appropriate means so as to have the same rotating speed around the common axis A. Such stranders are well-known in the art and their mode of operation can be derived from FIG. 11 where a possible embodiment of a strander 92 has been represented with more details.

Figure 11:
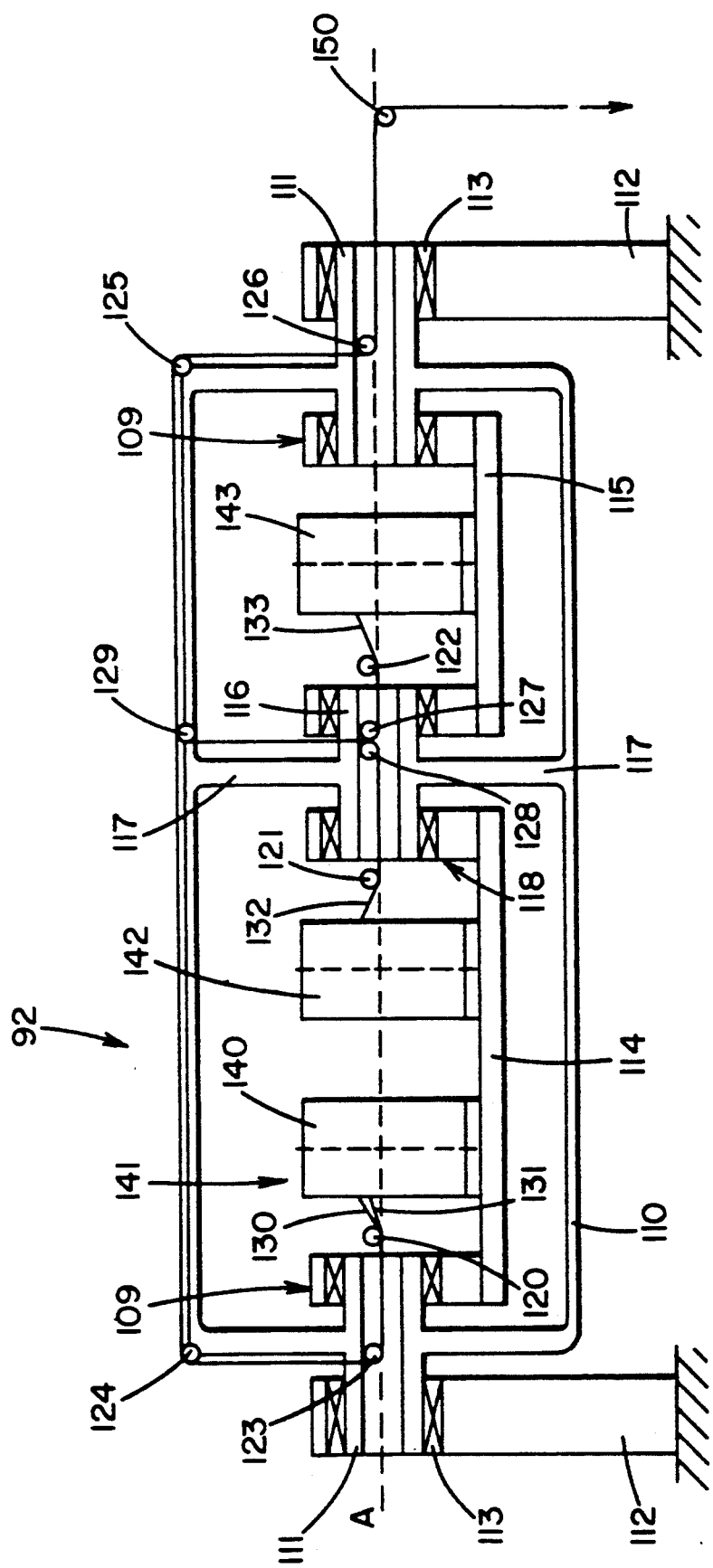
FIG. 11 is a schematic view of a machine which can be used for implementing the invention.

Referring to FIG. 11, where strander 92 is shown having a flyer 110 rotatably supported over two external axles 111 about a common horizontal axis denoted by A. Each axle 111 is mounted in a corresponding support 112 through ball bearings 113 or any other arrangement that allows free rotation of the axles 111. One of the axles 111 has a gear co-axially affixed to it that engages with a corresponding gear connected to a motor (the driving means are not represented).

The rotating flyer 110 is essentially an elongated tubular frame having large windows allowing an easy exchange of the bobbins and having sufficient rigidity to support the spool cradles 114 and 115. An intermediate axle 116 is fixed by struts 117 to the flyer body. This intermediate axle 116, though not compulsory for the operation of the twisting machine, is coaxial with the two external axles 111 and avoids a sagging of the assembly of the two cradles under the weight of the bobbins. The intermediate axle supports the neighboring ends of two cradles 114 and 115 through bushings and ball bearings 118, the other two ends of the spool cradles 114 and 115 being supported by bushings and ball bearing 109, thus allowing free rotation of the spool cradles 114 and 115 relative to the axis A.

The tubular frame and the cradles support a plurality of pulleys guiding the different filaments around and through the stranding apparatus. The pulleys have their axes of rotation perpendicular to the flyer axis. The pulleys 120–122 direct the filaments drawn from the spools 140–143 to the axis of rotation A and are free to rotate about their axes while the spools can be provided with brakes to prevent the spools from overriding, the wire being let off of the spools.

Filaments 130 and 131, supplied by the wire spools 140 and 141, are gathered and pass around the guide idler pulley 120 and sunken pulley 123 mounted in the axle. They are subsequently drawn past idler pulleys 124, 129, 125, mounted in the frame and sunken idler pulley 126, supported by the axle 111.

Filaments 132 and 133 are drawn off spools 142 and 143, pass around guide idler pulleys 121 respectively 122 and around sunken pulleys 128 respectively 127 mounted in the axle 116. Between pulleys 121 and 128 filament 132 is given a turn around its own axis for every revolution of the flyer and the same is true between pulleys 122 and 127 for filament 133. The turns are in opposite directions. However, no twisting together takes place, because the filaments 132, 133 do not meet each other before passing on pulley 129. At this point, they join the two filaments 130 and 131 which have been given one turn in a first direction when passing from idler pulley 120 to sunken pulley 123 located in the axle 111. Between pulleys 126 and 150 the filaments 130 and 131 are given a second turn in the first direction, whereas the filaments 132 and 133 receive a first turn in the same direction around the filaments 130 and 131.

From here the four filaments pass around pulleys 151–153 (see FIG. 9) and enter the center space delimited by filaments 160–168 forming the outer layer of the cord before making a 360° turn around pulley 154. The filaments 130–133 and 160–168 enter strander 91 and pass subsequently around the sunken pulley 155 supported by the axle, pulleys 156 and 157 on the outer surface of the flyer body and sunken pulley 158, supported by the axle. The stranding operation puts two turns in the filaments 160–168, forming the outer layer as well as two turns in the four filaments 130–133 coming from the strander 92. As these turns are in the opposite direction to the twisting direction imparted to the filaments by strander 92, this results in one turn in the filaments 132, 133 while the two turns from the filaments 130, 131 are removed. The latter two filaments are consequently now parallel because both initial turns have been removed from them and the former two filaments are twisted around them at a lay length which is double the lay length of the filaments 160–168. The finished cord passes around pulley 159 onto the wind-up spool 170, which provides the pulling force required for drawing the filaments through and around the constituents of the two stranders.

Figure 10:
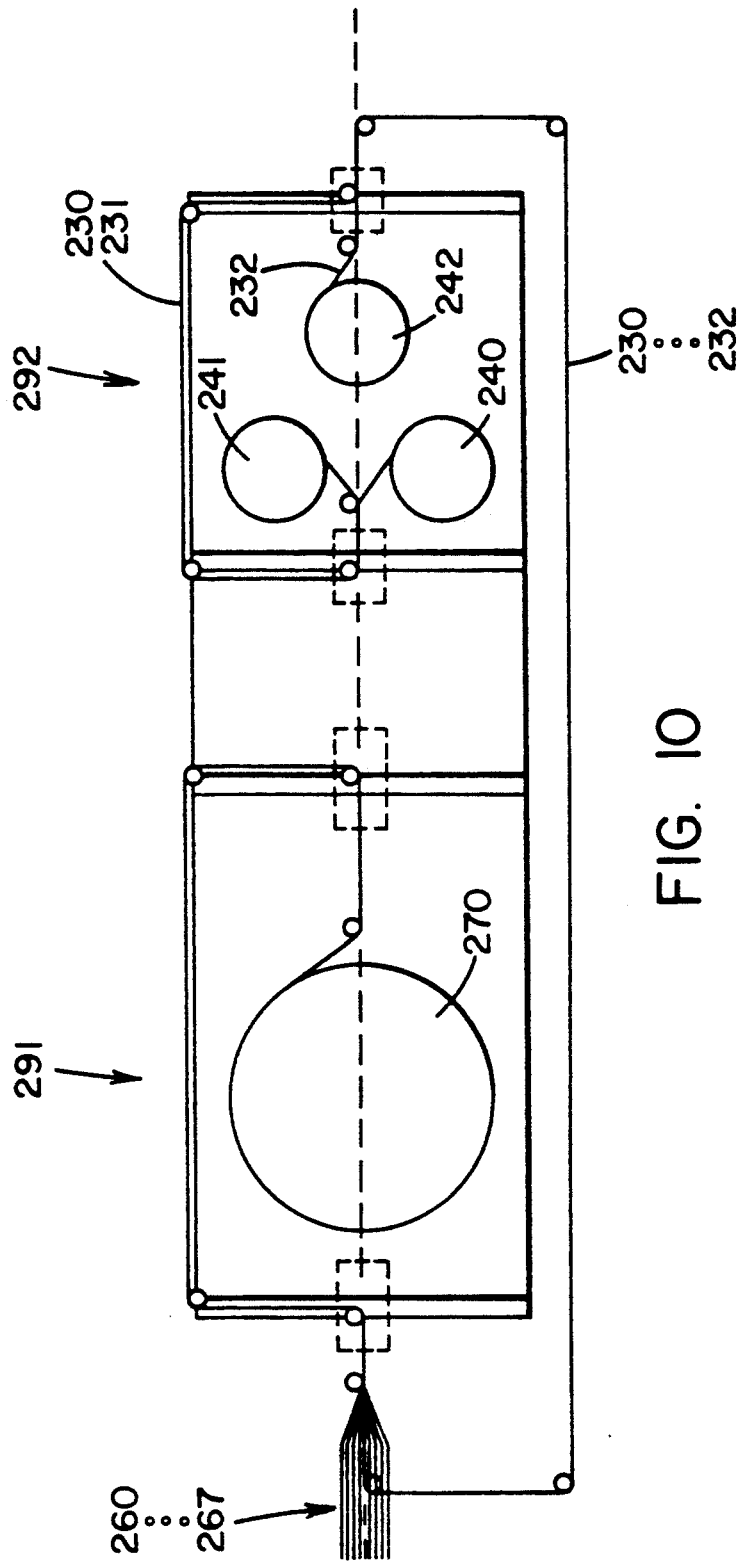
FIG. 10 is a schematic view of a machine which can be used for building a (2+1)+8 cord.

FIG. 10 is a schematic representation of a machine which can be used for building a (2+1)+8 cord. The main difference with the machine shown in FIG. 9 is to be seen in the absence of a fourth spool in the strander 292. The 2+1 cord construction is constituted by filaments 230, drawn off from spool 240 and filament 231, drawn off from spool 241 twisted around filament 232, drawn off from spool 242. The 2+1 cord is joined by 8 filaments 260–267, before entering the second strander 291. In the finished cord the two filaments 230, 231 of the core are parallel, whereas the third filament 232, of the 2+1 construction, is twisted around filaments 230, 231.

It is possible to have the wrapping filament—see reference 17 in FIG. 1 or reference 70 in FIG. 5—added to the cord just before the cord passes on the wind-up spool 170 or 270. But as a wrapping machine has usually a much lower rotating speed than a 2 by 1 strander, a wrapping filament is usually added on the cord in a subsequent step.

In order to evaluate the penetration of the elastomeric material into the cord according to the invention, samples having the same length but of different cord constructions have been covered with elastomeric material and submitted to vulcanization. One of the cord extremities, embedded in rubber was clamped, whereas on the opposite extremity only the core filaments were clamped. The forces to pull the core filaments out of the different cords were measured. Ranges of pull-out forces (expressed in newton), as measured on 5 cm long samples, are given in the table below.

Corrosion propagation in different wire constructions reinforcing the top breakers of truck tires having the size 13R22.5 was measured. The treads of all tires were cut at different positions in order to expose the wires of the top breakers. The tires equipped a nominally loaded vehicle running at a speed of 40 to 75 kilometers per hour on a distance ranging between 3 and 4 thousand kilometers; every 11 kilometers the tires travelled across a salt bath having a depth of at least 40 cm. The mean corrosion lengths observed are given in the following table for the samples (2+2)+8x.25+1x.15 and (2+2)+9x.25+1x.15 which are both made of generally 0.82% carbon steel. The comparative 12 filament cord sample is made of generally 0.7% carbon steel whereas the 3x.265+9x.245+1x.15 cord sample is made of generally 0.82% carbon steel. The samples according to the invention have core lay lengths of substantially 14 mm with a 7 mm outer layer lay length. The sample 12x.22+1x.15 has a lay length of substantially 12.5 mm and the sample 3x.265+9x.245+1x.15 has a core and an outer layer lay length of substantially 14.5 mm (the latter sample is a so-called bunched construction i.e. the core and the outer layer are made in one single twisting step).

| Wire Construction | Pull-out force | Mean propagation length |
| --- | --- | --- |
| 12x · 22 + 1x · 15 | 170–205 N | 13,4 cm |
| 3x · 265 + 9x · 245 + 1x · 15 | 230–310 N | 13,3 cm |
| 2 + 2 + 8x · 25 + 1x · 15 | 505–590 N | 1,8 cm |
| 2 + 2 + 9x · 25 + 1x · 15 | 505–535 N | 1,3 cm |

These data show clearly that in the construction according to the invention, the filaments of the core have an improved coverage by rubber which anchors the core in the cord. The corrosion resistance of the wire constructions according to the invention shows that possible voids between the individual filaments do not extend far along the cord so that the corrosion is confined to the immediate vicinity of the different cuts.

While certain representative embodiments have been described for the purpose of illustrating the invention, it will be apparent to those skilled in the art that various changes and modifications may be made therein without departing from the spirit or scope of the invention.

I claim:

1. A metallic cord for reinforcing elastomeric articles, the cord having a plurality of filaments comprising
   a core of m filaments being untwisted and n filaments twisted about each other and twisted around the m filaments wherein m is 2 to 3 and n is 1 to 3; and
   an outer layer of p filaments twisted around the core and having the same twist direction as the core, wherein p is 6 to 9.

2. A metallic cord as described in claim 1, wherein the n filaments of the core have a first lay length and the p filaments of the outer layer have a second lay length, half said fist lay length.

3. A metallic cord as described in claim 2, wherein the first lay length ranges from 14 to 34 mm.

4. A metallic cord as described in claim 2, wherein the first lay length ranges from 22 to 26 mm.

5. A metallic cord as described in claim 2, wherein a filament is wrapped around said outer layer, the wrapping filament having a twist direction opposed to the twist direction of the outer layer and a lay length at most half said second lay length.

6. A metallic cord as described in claim 5, wherein the wrapping filament has a diameter ranging between 0.12 and 0.18 mm.

7. A metallic cord as described in claim 1, wherein m equals 2, n equals 2 and p equals 8.

8. A metallic cord as described in claim 1, wherein m equals 2, n equals 2 and p equals 9.

9. A metallic cord as described in claim 1, wherein the diameter of all the filaments is from 0.20 to 0.30 mm.

* * * * *